United States Patent
Ikenoue et al.

(10) Patent No.: US 6,730,203 B2
(45) Date of Patent: May 4, 2004

(54) MULTI-LAYER COATING FILM-FORMING METHOD

(75) Inventors: Syuichi Ikenoue, Kanagawa-ken (JP); Akira Kasari, Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 195 days.

(21) Appl. No.: 09/955,204

(22) Filed: Sep. 19, 2001

(65) Prior Publication Data

US 2002/0056642 A1 May 16, 2002

(30) Foreign Application Priority Data

Sep. 20, 2000 (JP) .......................................... 2000-285312
Sep. 20, 2000 (JP) .......................................... 2000-285313

(51) Int. Cl.⁷ ............................................... C25D 13/10
(52) U.S. Cl. ........................................ 204/488; 204/506
(58) Field of Search ................................... 204/488, 506

(56) References Cited

U.S. PATENT DOCUMENTS

| | | |
|---|---|---|
| 2,450,940 A | 10/1948 | Cowan et al. |
| 3,403,088 A | 9/1968 | Hart et al. |
| 3,891,529 A | 6/1975 | Beesch |
| 3,963,663 A | 6/1976 | Sekmakas |
| 5,389,406 A * | 2/1995 | Doebler et al. ............. 204/488 |
| 5,702,581 A * | 12/1997 | Kerlin et al. ............... 204/486 |
| 6,096,378 A | 8/2000 | Komatsu et al. |
| 6,375,820 B1 * | 4/2002 | Tomizaki et al. ........... 204/489 |

FOREIGN PATENT DOCUMENTS

| | | |
|---|---|---|
| GB | 2334222 | 4/2001 |
| JP | 45/12395 | 5/1970 |
| JP | 45/12396 | 5/1970 |
| JP | 49/23087 | 3/1974 |
| JP | 63317695 | 12/1988 |
| JP | 2233181 | 9/1990 |

OTHER PUBLICATIONS

British Search Report of applicants' corresponding United Kingdom Patent Application.

* cited by examiner

*Primary Examiner*—Kishor Mayekar
(74) *Attorney, Agent, or Firm*—Fisher, Christen & Sabol

(57) ABSTRACT

A multi-layer coating film-forming method which comprises coating a cationic electrodeposition coating composition (A) containing a blocked polyisocyanate compound as a crosslinking agent and bismuth hydroxide to form a non-cured electrodeposition coating film, coating a water based intercoat coating composition ($B_1$) containing a hydroxyl group and carboxyl group-containing base resin, a blocked polyisocyanate crosslinking agent, a fine aluminum powder and a titanium oxide white pigment onto the non-cured electrodeposition coating film to form a non-cured intercoat coating film, followed by heat curing both coating films simultaneously.

4 Claims, No Drawings

MULTI-LAYER COATING FILM-FORMING METHOD

This application has benefit of the priority of Japanese Patent Application No. 00/285312, filed on Sep. 20, 2000, and Japanese Patent Application No. 00/285313, filed on Sep. 20, 2000.

BACKGROUND ART

(1) Field of the Invention

The present invention firstly relates to a multi-layer coating film-forming method which comprises coating a cationic electrodeposition coating composition and a water based intercoat coating composition by the wet-on-wet coating method, followed by heating and crosslink-curing both coating films simultaneously by the so called two coats one bake (2C1B) coating method to form a multi-layer coating film including an intercoat coating film having a thin film thickness, and showing good substrate-opacifying properties and good weather resistance.

The present invention secondly relates to a multi-layer coating film-forming method which comprises coating a cationic electrodeposition coating composition and a water based intercoat coating composition by the wet-on-wet coating method, followed by heating and crosslink-curing both coating films simultaneously by the so called two coats one bake (2C1B) coating method to form a multi-layer coating film improved in anti-chipping properties, water resistance, finished appearance such as gloss, interlayer adhesion properties and the like.

(2) Description of Background Art

It is known in the art that a multi-layer coating film is formed by a method which comprises coating a cationic electrodeposition coating composition and a water based intercoat coating composition onto an electrically conductive substrate such as an automobile body and the like by the 2C1B coating method to form a multi-layer coating film.

However, the use of the above intercoat coating composition may easily develop sagging and bubbling, consequently makes it difficult to form a thick coating film, and results in that an unsatisfactory ultraviolet light-shielding power of the intercoat coating film makes it easy for an ultraviolet light permeating through a topcoating film to reach an electrodeposition coating film and to reduce weather resistance thereof.

It is an object of the present invention to provide a multi-layer coating film-forming method which is capable of solving the above problems of the multi-layer coating film formed by coating the cationic electrodeposition coating composition and the water based intercoat coating composition by the 2C1B coating method, and capable of forming a multi-layer coating film including an intercoat coating film having good substrate-opacifying properties and showing good weather resistance.

Now, it was found that on coating the cationic electrodeposition coating composition and the water based intercoat coating composition by the 2C1B coating method, use of a water based intercoat coating composition containing a hydroxyl group and carboxyl group-containing base resin, a crosslinking agent, a fine aluminum powder and a titanium oxide white pigment can achieve the above object, and results in improving the substrate-opacifying properties of the intercoat coating film, and weather resistance of a multi-layer coating film formed by coating the cationic electrodeposition and the water based intercoat coating composition, and in accomplishing the present invention.

On the other hand, it is also known in the art that a multi-layer coating film is formed by a method which comprises coating a cationic electrodeposition coating composition containing a blocked polyisocyanate compound as a crosslinking agent, and a water based intercoat coating composition containing a polyester resin and a blocked polyisocyanate compound by the 2C1B coating method to form a multi-layer coating film.

However, the above method had such problems that the resulting multi-layer coating film shows such unsatisfactory finished appearance or gloss as difficult to be solved by coating a topcoating composition, may develop chipping or peeling between both coating films when hit by jumping stones while the automobile is running, and shows unsatisfactory water resistance.

It is another object of the present invention to provide a multi-layer coating film-forming method which is capable of solving the above problems of the multi-layer coating film formed by coating the cationic electrodeposition coating composition and the water based intercoat coating composition by the 2C1B coating method, and capable of forming a multi-layer coating film showing good properties in finished appearance, anti-chipping properties, water resistance and the like.

Now, it was found that on coating the cationic electrodeposition coating composition and the water based intercoat coating composition by the 2C1B coating method, use of a water based intercoat coating composition containing a hydroxy group and carboxyl group-containing base resin, a blocked polyisocyanate crosslinking agent and an alicyclic epoxy compound can achieve the above object to accomplish the present invention.

SUMMARY OF THE INVENTION

The present invention firstly provides a multi-layer coating film-forming method which comprises coating a cationic electrodeposition coating composition (A) containing a blocked polyisocyanate compound as a crosslinking agent to form a non-cured electrodeposition coating film, coating a water based intercoat coating composition ($B_1$) containing a hydroxyl group and carboxyl group-containing base resin, a blocked polyisocyanate crosslinking agent, a fine aluminum powder and a titanium oxide white pigment onto the non-cured electrodeposition coating film to form a non-cured intercoat coating film, followed by heat curing both coating films simultaneously (hereinafter may be referred to as a first invention).

The present invention secondly provides a multi-layer coating film-forming method which comprises coating a cationic electrodeposition coating composition (A) containing a blocked polyisocyanate compound as a crosslinking agent to form a non-cured electrodeposition coating film, coating a water based intercoat coating composition ($B_2$) containing a hydroxyl group and carboxyl group-containing base resin, a blocked polyisocyanate crosslinking agent and an alicyclic epoxy compound to form a non-cured intercoat coating film, followed by heat curing the both coating films simultaneously (hereinafter may be referred to as a second invention).

Preferably in the method of the present invention, for the purpose of achieving the above objects of the present invention, a crosslink-curing reaction of the non-cured coating film formed from the cationic electrodeposition coating composition (A) may be controlled so as to take place earlier than a crosslink-curing reaction of a non-curing coating film formed from a water based intercoat coating composition ($B_1$) or $B_2$).

In the method of the present invention, measurement of a crosslink-curing reaction starting time of a coating film formed from the cationic electrodeposition coating composition (A), or the water based intercoat coating composition ($B_1$) or ($B_2$) may be carried out by use of a pendulum type viscoelastometer such as Rheovibron DDV-OPA Type (marketed by Toyo Baldwin Co., Ltd.). Specifically, a pendulum having a weight of 22 g and a moment of inertia of 850 g•cm$^2$ is placed on a non-cured coating film coated onto a steel sheet so as to be a cured coating film of 30 μm, followed by heating at a predetermined temperature for crosslink-curing the non-cured coating film, for example, in the range of 140 to 180° C. to determine a time when a logarithmic decrement of the pendulum starts increasing as a crosslink-curing starting time, and to determine a time period from a starting time of heating to a crosslink-curing starting time as a period of time for starting curing, wherein a shorter period of time for starting curing means that the crosslink-curing reaction takes place earlier, and comparison of the crosslink-curing starting time between both coating films is made based on the results measured at the same temperature.

DETAILED DESCRIPTION OF THE INVENTION

Details of the multi-layer coating film-forming method of the present invention will be explained hereinafter.

Cationic Electrodeposition Coating Composition (A):

The cationic electrodeposition coating composition (A) of the present invention is a cationic electrodeposition coating composition which contains a blocked polyisocyanate compound as a crosslinking agent, more preferably contains a hydroxyl group and cationic group-containing base resin (A-1) and a blocked polyisocyanate compound (A-2).

The base resin (A-1) is such that the hydroxyl group therein participates in a crosslinking reaction with the blocked polyisocyanate compound, and the cationic group functions to form a stable water dispersion.

The base resin (A-1) may include, for example, (i) a reaction product of a polyepoxy resin with a cationizing agent; (ii) a resin prepared by protonizing a polycondensation product (see U.S. Pat. No. 2,450,940) of a polycarboxylic acid with a polyamine by use of an acid; (ii) a resin prepared by protonizing a polyaddition product of a polyisocyanate compound and polyol with mono- or polyamine by use of an acid; (iv) a resin prepared by protonizing a copolymer of hydroxyl group and amino group-containing acrylic or vinyl monomers by use of an acid (see Japanese Patent Publication Nos. 12395/70, 12396/70); and (v) a resin prepared by protonizing an addition product of polycarboxylic acid resin and alkylene imine by use of an acid (see U.S. Pat. No. 3,403,088).

Details of specific examples and preparation methods of the above cationic resins may be referred to, for example, Japanese Patent Publication Nos. 12395/70, 12396/70 and 23087/74, U.S. Pat. Nos. 2,450,940, 3,403,088, 3,891,529 and 3,963,663, and the like.

The base resin (A-1) is particularly a reaction product prepared by reacting a cationizing agent with the epoxy group of a highly anticorrosive polyepoxide resin obtained by reaction of a polyphenol compound with epichlorohydrin as included in the above (i).

The polyepoxide resin may include a low molecular weight or high molecular weight compound having at least two epoxy group in one molecule, preferably having a number average molecular weight in the range of 200 or more, preferably 400 to 4000, more preferably 800 to 2000.

The above polyepoxide resin may include any known ones, for example, polyglycidyl ether of a polyphenol compound as prepared by reacting a polyphenol compound with epichlorohydrin in the presence of an alkali. The polyphenol compound may include, for example, bis(4-hydroxvphenyl) 2,2-propane, 4,4-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis (2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4-dihydroxyphenylsulfone, phenol novolak, cresol novolak, and the like.

Of the above examples of the polyepoxide resin, a polyglycidyl ether of polyphenol compound having a number average molecular weight of about 380 or more, preferably about 800 to about 2000, and an epoxy equivalent of 190 to 2000, preferably 400 to 1000 is particularly preferable from the standpoint of the preparation of the base resin (A-1), may be partly reacted with polyol, polyether polyol, polyester polyol, polyamideamine, polycarboxylic acid, polyisocyanate compound and the like, and further may be subjected to graft polymerization with ε-caprolactone, acrylic monomer and the like.

The reaction product (i) of the polyepoxy resin with the cationizing agent may be obtained by reacting all or almost all of the epoxy groups in the polyepoxide resin with the cationizing agent.

The cationizing agent may include, for example, amine compounds such as a primary amine, secondary amine, tertiary amine, polyamine and the like, and is such that a reaction thereof with epoxy group by a method known per se introduces a cationic group such as secondary amino group, tertiary amino group, quaternary ammonium salt group and the like into the epoxy resin to obtain a cationic group-containing resin.

The primary amine compound may include, for example, methylamine, ethylamine, n-propylamine, isopropylamine, monoethanolamine, n-propanolamine, isopropanolamine and the like; the secondary amine compound may include, for example, diethylamine, diethanolamine, di-n-propanolamine, diisopropanolamine, N-methylethanolamine, N-ethylethanolamine and the like; the tertiary amine compound may include, for example, triethylamine, triethanolamine, N,N-dimethylethanolamine, N-methyldiethanolamine, N,N-diethylethanolamine, N-ethyldiethanolamine and the like; the polyamine may include, for example, ethylenediamine, diethylenetriamine, hydroxyethylaminoethylamine, ethylaminoethylamine, methylaminopropylamine, dimethylaminoethylamine, dimethylaninopropylamine, and the like.

A basic compound such as ammonia, hydroxyamine, hydrazine, hydroxyethylhydrazine, N-hydroxyethylimidazoline and the like other than the above amine compounds may be used as a cationizing agent, and may be reacted with epoxy group in the polyepoxy resin to form a basic group, which may be protonized by use of an acid to form a cationic group. The above acid may include a water-soluble organic carboxylic acid such as formnic acid, acetic acid, glycolic acid, lactic acid and the like.

The hydroxyl group in the above cationic resins may include, for example, primary hydroxyl group introduced by reaction with the alkanolamine in the cationizing agent, reaction with a ring opening product of caprolactone, which may be introduced into the polyepoxide resin, and polyol, and the like; secondary hydroxyl group originally present in the epoxy resin, and the like. Of these, the primary hydroxyl group introduced by the reaction with alkanolamine is preferable because of a good crosslinking reactivity with the blocked polyisocyanate compound as the crosslinking agent. The above alkanolamine may preferably include ones exemplified as the cationizing agent as above.

A hydroxyl group content in the base resin (A-1) is such that a hydroxyl group equivalent may be in the range of 20 to 5000, preferably 60 to 3000, more preferably 100 to 1000 mg KOH/g, particularly primary hydroxyl group equivalent may be in the range of 200 to 1000 mg KOH/g. A cationic group content may be in the range of a minimum amount necessary to stably disperse the base resin into water or more, as an amine value, 3 to 200, preferably 5 to 150, more preferably 10 to 80 mg KOH/g (solid content).

The base resin (A-1) desirably contains no free epoxy group.

On the other hand, the blocked polyisocyanate compound (A-2) used as the crosslinking agent in the cationic electrodeposition coating composition is such that essentially all of isocyanate groups in a polyisocyante compound are reacted and blocked with a volatile active hydrogen compound as a blocking agent so as to be inactive at normal temperature, and such that heating at a predetermined temperature dissociates the blocking agent to regenerate the original isocyanate group, which participate in the crosslinking reaction with the base resin (A-1).

The polyisocyanate compound is a compound having at least two free isocyanate groups in one molecule, and may include, for example, aliphatic diisocyanate such as hexamethylene diisocyanate, trimethylene diisocyanate, tetramethylene diisocyanate, dimer acid diisocyante, lysine diisocyante and the like; alicyclic diisocyante such as isophorone diisocyante, methylenebis(cyclohexylisocyanate), methylcyclohexane diisocyante, cyclohexane diisocyante, cyclopentane diisocyante and the like; aromatic diisocyanate such as xylylene diisocyanate, tolylene diisocyanate, diphenylmethane diisocyanate, naphthalene diisocyanate, toluidine diisocyanate and the like: urethanized adduct of above polyisocyanate compounds, biuret type adducts, isocyanuric ring type adducts, and the like.

The blocking agent used for temporarily block the isocyanate group in the above polyisocyanate compounds may include, for example, phenol blocking agent, alcohol blocking agent, active methylene blocking agent, mercaptan blocking agent, acid amide blocking agent, imide blocking agent, amine blocking agent, imidazole blocking agent, urea blocking agent, carbamic acid blocking agent, imine blocking agent, oxime blocking agent, sulfurous acid blocking agent, lactam blocking agent, and the like.

A reaction between the polyisocynate compound and an active hydrogen compound as a blocking agent may be carried out by a process known per se, and the resulting blocked polyisocyante compound preferably contains no free isocyanate groups.

A mixing ratio of the base resin (A-1) to the blocked polyisocyanate compound (A-2) in the cationic electrodeposition coating composition (A) may not particularly be limited, but is such that the base resin (A-1) is in the range of 40 to 90%, particularly 50 to 80%, and the blocked polyisocyanate compound (A-2) is in the range of 60 to 10%, particularly 50 to 20% based on a total solid content weight of both components.

The cationic electrodeposition coating composition (A) is such that a cationic group in the base resin (A-1) may be neutralized with an acid compound such as acetic acid, formic acid, lactic acid, phosphoric acid and the like, followed by dispersing and mixing into water along with the blocked polyisocyanate compound (A-2) to obtain a water dispersion, which preferably has a pH in the range of 3 to 9, particularly 5 to 7, and a resin solid content in the range of 5 to 30% by weight.

The cationic electrodeposition coating composition (A) may optionally contain anti-corrosive curing catalysts, for example, hydroxides, oxides, organic acid salts and inorganic salts of a metal selected from aluminum, nickel, zinc, strontium, zirconium, molybdenum, antimony, tungsten and the like; extender pigments, color pigments, anti-settling agents and the like.

The cationic electrodeposition coating composition (A) may also contain, for the purpose of promoting a crosslinking reaction between the base resin (A-1) and the blocked polyisocyante compound (A-2), a curing catalyst such as tin octoate, dibutyltin dilaurate, manganese-containing compound., cobalt-containing compound, lead-containing compound, zirconium octoate, zine octoate, dibutyltin-bis-o-phenylphenylene, dibutyltin-S, S-dibutyldithiocarbonate, triphenylantimony chloride, dibutyltin maleate, dibutyltin diacetate, dibutyltin dilaurate mercaptide, triethylenediamine, dimethyltin dichloride and the like. A mixing amount thereof preferably is in the range of 0.1 to 10 parts by weight, particularly 0.5 to 2 parts by weight per 100 parts by weight of a total amount of the base resin (A-1) and the blocked polyisocyanate compound (A-2).

The cationic electrodeposition coating composition (A) in the method of the present invention preferably may include a lead-free cationic electrodeposition coating composition containing a bismuth-containing compound (A-3) in addition to the base resin (A-1) and the blocked polyisocyanate compound (A-2). The use of the lead-free cationic electrodeposition coating composition makes it possible to form an electrodeposition coating film showing good properties in anti-corrosive properties, curing properties and the like without using a lead compound which is undesirable from the standpoint of environmental health.

The bismuch-containing compound (A-3) contained in the cationic electrodeposition coating composition (A) may include oxides, hydroxides, salts with inorganic or organic acids thereof, for example, bismuth hydroxide, bismuth trioxide, bismuth nitrate, bismuth benzoate, bismuth citrate, bismuth oxycarbonate, bismuth silicate and he like Of these, bismuth oxides preferable. The bismuth-containing compound (A-3) is preferably in the range of 0.1 to 10 parts by weight, preferably 0.15 to 7.5 parts by weight, more preferably 0.2 to 5 parts by weight per 100 parts by weight of a total solid content of the base resin (A-i) and the blocked polyisocyanate compound (A-2).

The bismuth-containing compound (A-3) may be used in the form of a water-dispersed paste prepared by Egg and dispersing optionally in the presence of a dispersing agent into an aqueous medium a water-insoluble bismuth compound and an aliphatic carboxylic acid represented by the formula: $R_1C(H)$ $(OR_2)$ $(CH_2)_N COOH$, wherein $R_1$ is hydrogen atom or an allyl group having 1 to 3 carbon atoms, $R_2$ is hydrogen atom or an alkyl group having 1 to 10 carbon atoms and n is 0 or 1, and containing a resulting aliphatic carboxylic acid-modified bismuth compound uniformly and stably dispersed therein in a water-insoluble state.

The water-insoluble aliphatic acid-anodified bismuth-containing water-dispersed paste (hereinafter may be referred to as a bismuth water-dispersed paste or simply a water-dispersed paste) contained in the cationic electrodeposition coating composition (A) may be prepared by mixing and dispersing the water insoluble bismuth compound and the aliphatic carboxylic acid represented by the above formula in an aqueous medium in the presence of a dispersing agent, wherein the aliphatic carboxylic acid may be used in such an amount as to mainly form a water-insoluble aliphatic acid-modified bismuth compound to obtain a bismuth water-dispersed paste containing a resulting aliphatic acid-modified bismuth compound dispersed therein uniformly and stably in a water-insoluble state. The use of the cationic electrodeposition coating composition (A) containing the water-dispersed paste makes it possible to remarkably improve a resulting electrodeposition coating film in curing properties, anti-corrosive properties and the like without impairing throwing power and finished properties.

The water-dispersed paste is such that a water-soluble bismuth compound content in a supernatant liquid obtained by centrifuging the water-dispersed paste under the conditions of 1200 rpm and 30 minutes may desirably be in the range of about 40% by weight or less, preferably about 30% by weight or less, more preferably about 20% by weight or less based on a total amount of the water insoluble starting bismuth compound in terms of a weight as metal bismuth.

The water insoluble bismuth compound used in the bismuth water-dispersed paste may include a bismuth compound having a solubility in water at 20° C. in the range of 0.001 g/100 g or less for example, bismuth oxide, bismuth hydroxide, tribasic bismuth carbonate and the like. Of these, bismuth oxide in preferable.

The aliphatic carboxylic acid represented by the above formula is used for the purpose of obtaining a sufficiently uniform dispersion of the water insoluble bismuth compound in an aqueous medium, and may include, for example, aliphatic hydroxycarboxylic acid such as hydroxyacetic acid, lactic acid, hydroxypropionic acid and the like; aliphatic alkoxycarboxylic acid such as methoxyacetic acid, ethoxyacetic acid, 3-methoxypropionic acid and the like, and the like. Of these, lactic acid, particularly L-lactic acid and methoxyacetic acid are preferable. These may be used alone or in combination. These aliphatic carboxylic acids may be used in combination with other organic acids such as acetic acid.

An amount of the aliphatic carboxylic acid may be in such an amount that the resulting aliphatic carboxylic acid-modified bismuth compound can be in a water-insoluble state, depending on the kind of the aliphatic carboxylic acid, for example, L-lactic acid is in the range of 0.5 to 1.7, preferably 0.75 to 1.3 as a molar ratio to an amount of bismuth in the water insoluble bismuth compound, and methoxyacetic acid is in the range of 0.25 to 2.5, preferably 0.5 to 1.3 as a molar ratio to an amount of bismuth in the water insoluble bismuth compound.

The bismuth-containing compound may effectively include a bismuth lactate prepared by using a lactic acid containing 80% or more of L-isomer of optcal isomers, and may specifically include an aqueous bismuth lactate solution prepared by reacting one mole of bismuth oxide with 2 to 10 moles of a lactic acid containing 80% or more of L-isomer in the presence of water. A mixing amount of bismuth lactate is in the range of 0.1 to 10 parts by weight, preferably 0.2 to 5 parts by weight per 100 parts by weight of a resin solid content of the electrodeposition coating composition.

The lactic acid used in the preparation of the bismuth lactate preferably may include ones containing 80% or more of L-isomer or less than 20% of D-isomer, preferably 85% or more of L-isomer, more preferably 90% or more of L-isomer of optical isomers. L-isomer less than 80% may reduce solubility. L-lactic acid is preferably one prepared by a fermentation process. The bismuth compound used in the preparation of bismuth lactate may also include bismuth hydroxide, basic bismuth carbonate besides bismuth oxide.

A reaction between the bismuth compound and lactic acid may preferably be carried out at a ratio in the range of 2 to 10 moles, preferably 3 to 8 moles of a lactic acid containing 80% or more of L-isomer per one mole of the bismuth compound. For example, a reaction therebetween at a ratio of 2 to 10 moles, preferably 3 to 8 moles of a lactic acid containing 80% or more of L-isomer per one mole of bismuth oxide at room temperature for 1 to 30 hours in the presence of water results a uniform aqueous bismuth lactate solution. A lactic acid less than 2 moles may make water solubilization difficult, when more than 10 moles, electrodeposition coating properties may be reduced. In the case where bismuth hydroxide is used, bismuth lactate may be obtained by reacting 1 to 5 moles, preferably 1.5 to 4 moles of a lactic acid containing 80% or more of L-isomer per one mole of bismuth hydroxide. Resulting reaction solid content is in the range of 0.1 to 80% by weight, preferably 0.5 to 70% by weight, more preferably 1 to 60% by weight.

Addition of the aqueous bismuth lactate solution may be carried out before or after the water dispersion step of the cationic electrodeposition coating composition. A solid content at the time when the aqueous bismuth lactate solution is added may not be particularly limited before the water dispersion step, but may preferably be 60% by weight or less when added after the water dispersion step, so that the bismuth lactate may be uniformly dispersed in the electrodeposition coating composition. The addition of the aqueous bismuth lactate solution may preferably be carried out after the dispersion step of the electrodeposition coating composition from the standpoints of easiness of formulation of the coating composition, storage stability and the like.

The above dispersing agent may include a cationic dispersing resin known per se in the field of the elecrtrodeposition coating composition, surface active agent and the like without any limitations. The cationic dispersing resin may be arbitrarily selected from those exemplified as the base resin for use in the electrodeposition coating composition, and may include, for example, resins of tertiary amine type, quaternary ammonium salt type, tertiary sulfonium salt type and the like. The surface active agent may include nonionic surface active agents such as acetylene glycol based, polyethylene glycol based, polyhydric alcohol based surface active agents, and the like, haling a HLB in the range of 3 to 18, preferably 5 to 15 respectively.

A mixing amount of the dispersing agent may be varied depending on a kind thereof, an amount of the water insoluble bismuth compound and the like, but preferably is in the range of 1 to 150 parts by weight, preferably 10 to 100 parts by weight per 100 parts by weight of the water insoluble bismuth compound.

The preparation of the bismuth water dispersed paste by use of the water insoluble bismuth compound, the aliphatic carboxylic acid and the dispersing agent may be carried out in the same manner as in the preparation of a pigment paste used in the cationic electrodeposition coating composition, and specifically for example, may be carried out by adding the aliphatic carboxylic acid and the water insoluble bismuth compound to water containing the dispersing agent, followed by dispersing in a dispersion mixer such as a ball mill, sand mill and the like to obtain a bismuth water dispersed paste having a solid content of 10 to 70% by weight, preferably 30 to 60% by weight.

A pigment used in the cationic electrodeposition coating composition may be added to the above water dispersed paste to prepare a pigment paste. Specifically, for example, a mixture of a pigment dispersing resin neutralizing agent and pigments is dispersed in a dispersion mixer such as a ball mill, sand mill and the like to prepare a pigment paste, followed by adding the above bismuth water dispersed paste. The neutralizing agent used in the neutralization of the pigment dispersing resin may include an organic acid such as acetic acid, formic acid, lactic acid and the like.

The pigment dispersing resin may include ones known in the art without limitations, for example, the same cationic dispersing resin as used in the preparation of the above bismuth water dispersed paste.

The above pigments may include any pigments used in the cationic electrodeposition coating composition without particular limitations, for example, color pigments such as titanium oxide, carbon black, red oxide and the like; extender pigments such as clay, mica, baryta, talc, calcium carbonate, silica and the like: and anticorrosive pigments such as aluminum phosphomolybdate, aluminum tripolyphosphate and the like.

The bismuth water dispersed paste or the water dispersed paste may be mixed with a binder resin component of the cationic electrodeposition coating composition.

The bismuth water dispersed paste may be mixed with the cationic electrodeposition coating composition in such an amount as a bismuth metal content in the range of 0.1 to 10 parts by weight, preferably 0.3 to 7 parts by weight, more preferably 0.5 to 5 parts by weight per 100 parts by weight of a total solid content of the base resin (A-1) and the blocked polyisocyanate compound (A-2).

In the method of the present invention, a crosslink-curing reaction of a non-cured coating film formed from the cationic electrodeposition coating composition (A) may preferably take place earlier than an upper non-cured intercoat coating film formed from a water based intercoat coating composition ($B_1$) or ($B_2$). Therefore, for example, a curing temperature of the non-cured coating film formed from the cationic electrodeposition coating composition may preferably be set at a temperature lower than a curing temperature of the non-cured coating film formed from the intercoat coating composition ($B_1$) or ($B_2$). For example, the above curing temperature difference may preferably be in the range of 0 to 20° C., preferably 5 to 15° C. When the crosslink-curing reaction of the non-cured coating film formed from the cationic electrodeposition coating composition (A) takes place later than the non-cured intercoat coating film, improvements of a resulting multi-layer coating film in finished appearance such as smoothness, gloss and the like, interlayer adhesion properties between two coating film and the like may be made difficult.

A starting time of the crosslink-curing reaction of the non-cured coating film formed from the cationic electrodeposition coating composition (A) may be controlled by suitably selecting kinds or amounts of, for example, a polyisocyanate compound, blocking agent, curing catalyst and the like.

In the case of a non-cured coating film formed from the cationic electrodeposition coating composition (A), a period of time from a starting time of heating to a crosslink-curing reaction starting time i.e. a period of time for starting curing may suitably be in the range of 5 to 15 minutes during the coating step.

Coating of the cationic electrodeposition coating composition (A) may be carried out under the conditions of a coating substrate as a cathode, a carbon plate as an anode, a bath temperature in the range of 20 to 35° C., a voltage in the range of 100 to 400V, a current density in the range of 0.01 to 5A and an energizing time in the range of 1 to 10 minutes. A coating film thickness may preferably be in the range of 10 to 40 $\mu$m as a cured coating film. The coating substrate may include, for example, a substrate having an electrically conduction metal surface such as an automobile body, electrical products and the like.

The method of the present invention comprises coating a cationic electrodeposition coating composition (A) to form a non-cured coating film followed by coating a water based intercoat coating composition ($B_1$) or ($B_2$) onto the non-cured coating film.

Water Based Intercoat Coating Composition ($B_1$):

The water based intercoat coating composition ($B_1$) is a water based coating composition containing a hydroxyl group and carboxyl group-containing base resin ($B_1$-1), a blocked polyisocyanate crosslinking agent ($B_1$-2), a fine aluminum powder ($B_1$-3) and a titanium oxide white pigment ($B_1$-4).

The hydroxyl group and carboxyl group-containing base resin ($B_1$-1) may include, for example, polyester resin and acrylic resin containing at least two hydroxyl groups and carboxyl groups in one molecule respectively.

The above polyester resin may be prepared by an esterifying reaction between a polybasic acid and a polyhydric alcohol, and preferably has a number average molecular weight in the range of 1000 to 50000, preferably 2000 to 20000, a hydroxy value in the range of 20 to 200 mg KOH/g, preferably 50 to 150 mg KOH/g, and an acid value in the range of 3 to 100 mg KOH/g, preferably 10 to 70 mg KOH/g, The polybasic acid is a compound containing at least two carboxyl groups in one molecule, and may include, for example, phthatic acid, isophthalic acid, teriphthalic acid, succinic acid, adipic acid, azelaic acid, sebacic acid, tetrahydrophthalic acid, HET acid, maleic acid, fumaric acid, itaconic acid, trimellitic acid, pyromellitic acid, anhydrides thereof and the like.

The polyhydric alcohol is a compound having at least two hydroxyl groups in one molecule, and may include, for example, ethylene glycol, propylene glycol, diethylene glycol, butylene glycol, hexane diol, dipropylene glycol, neopentyl glycol, hydrogenated bisphenol A, triethylene glycol, glycerin, trimethylol ethane, trimethylol propane, pentaerythritol and the like.

The hydroxyl group and carboxyl group are bonded directly or indirectly to the polyester resin skeleton, for example, may be introduced thereinto by a combined use of a polybasic acid and polyhydric alcohol having at least 3 carboxyl groups and hydroxyl groups in one molecule respectively.

The acrylic resin may be prepared by copolymerizing polymerizable monomer components containing a hydroxyl group-containing polymerizable monomer, carboxyl group-containing polymerizable monomer and an acrylic monomer under usually known conditions, and has a number average molecular weight of 1000 to 50000, preferably 2000 to 20000, a hydroxy value of 20 to 200 mg KOH/g, preferably 50 to 150 mg KOH/g, and an acid value of 3 to 100 mg KOH/g, preferably 20 to 70 mg KOH/g.

The hydroxyl group-containing polymerizable monomer is a compound having at least one hydroxyl group and polymerizable unsaturated bond in one molecule respectively, and may include, for example, monoesterified products of $C_{2-20}$ glycols such as hydroxyethyl (meth) acrylate, hydroxypropyl (meth)acrylate, hydroxybutyl (meth)acrylate and the like with (meth)acrylic acid, and the like.

The carboxyl group-containing polymerizable monomer is a compound having at least one carboxyl group and polymerizable unsaturated bond in one molecule respectively, and may include, for example, acrylic acid, methacrylic acid, maleic acid, itaconic acid, fumaric acid, mesaconic acid, anhydrides thereof, half-esterified products thereof, and the like.

The acrylic monomer is a monoestrified product of (meth) acrylic acid with monohydric alcohol having 1 to 22 carbon atoms, and may include, for example, methyl acrylate, methyl methacrylate, ethyl acrylate, ethyl methacrylate, propyl acrylate, propyl methacryate, butyl acrylate, butyl methacrylate, hexyl acrylate, hexyl methacrylate, octyl acrylate, octyl methacrylate, lauryl acrylate, lauryl methacrylate, 2-ethylhexyl acrylate, 2-ethylhexyl methacrylate and the like.

In the preparation of the hydroxyl group and carboxyl group-containing acrylic resin, a polymerizable monomer other than the hydroxyl group-containing polymerizable monomer, the carboxyl group-containing polymerizable monomer and the acrylic monomer may also be used.

The above other polymerizable monomer may include, for example, $C_{2-18}$ alkoxy esters with (meth)acrylic acid such as methoxybutyl acrylate, methoxybutyl methacrylate, methoxyethyl acrylate, methoxyethyl methacrylate and the like; aminoacrylic monomer such as N,N-dimethylaminoethyl acrylate, N,N-dimethylaminoethyl methacrylate, N,N-diethylaminoethyl acrylate, N,N-diethylaminoethyl methacrylate, N-t-butylaminoethyl acrylate. N-t-butylaminoethyl methacrylate, N,N-dimethylaminopropyl acrylate, N,N-dimethylaminopropyl methacrylate and the like; acrylamide monomer such as acrylamide, methacrylamide, N-methyl acrylamide, N-methyl methacrylamide, N-ethyl acrylamide, N-ethyl methacrylamide, N-butyl acrylamide, N-butyl methacrylamide, N-dimethyl acrylamide, N-dimethyl methacrylamide and the like; glycidyl group-containing monomer such as glycidyl acrylate, glycidyl methacrylate and the like; styrene, α-methylstyrene, vinyltoluene, acrylonitride, vinyl acetate, vinyl chloride and the like.

The blocked polyisocyanate crosslinking agent ($B_1$-2) is used for crosslink-curing the base resin ($B_1$-1), and may include at least one selected from ones exemplified as the blocked polyisocyanate compound (A-2) explained as the crosslinking agent used in the cationic electrodeposition coating composition (A), and preferably having a number average molecular weight in the range of 150 to 3000.

A mixing ratio of the base resin ($B_1$-1) to the crosslinking agent ($B_1$-2) in the water based intercoat coating composition ($B_1$) is such that the base resin ($B_1$-1) is in the range of 40 to 90%, preferably 50 to 80%, and crosslinking agent ($B_1$-2) is in the range of 60 to 10%, preferably 50 to 20% based on the weight of a total solid content of both components.

The fine aluminum powder ($B_1$-3) may preferably include a fine power of metal aluminum, and may suitably have a mean particle size in the range of 20 $\mu$m or less, preferably 10 $\mu$m or less, more preferably 3 to 7 $\mu$m, and a thickness in the range of 0.01 to 0.2 $\mu$m, preferably 0.03 to 0.1 $\mu$m. The above mean particle size means a medium diameter in accordance with a laser diffraction pattern method (LA-500). The fine aluminum powder ($B_1$-3) may also include deposited aluminum powder.

The titanium oxide white pigment ($B_1$-4) may include a white pigment known per se as a white pigment for use in the coating composition, and preferably having a mean particle size of 5 $\mu$m or less, and may also include ones treated with alumina, silica or the like on the surface.

In the water based intercoat coating composition ($B_1$), a mixing amount of the fine aluminum powder ($B_1$-3) and titanium oxide white pigment ($B_1$-4) may be arbitrarily selected depending on purposes, but preferably the fine aluminum powder ($B_1$-3) is in the range of 0.1 to 30 parts by weight, preferably 1 to 10 parts by weight, and the titanium oxide white pigment ($B_1$-4) is in the range of 1 to 20 parts by weight, preferably 80 to 120 parts by weight per 100 parts by weight of a total solid content of the hydroxyl group and carboxyl group-containing base resin ($B_1$-3) and the crosslinking agent ($B_1$-2). The fine aluminum powder ($B_1$-3) is preferably in the range of 1 to 15 parts by weight, preferably 2 to 7 parts by weight per 100 parts by weight of the titanium oxide white pigment ($B_1$-4).

A combined use of the fine aluminum powder ($B_1$-3) with the titanium oxide white pigment ($B_1$-4) makes it possible to reduce a laminous transmittance of the coating film formed from the water based intercoat coating composition ($B_1$), for example, to 1% or less at a wave length in the range of 400 to 700 nm, and a coating film thickness of 25 $\mu$m or less, preferably 10 to 20 $\mu$m, resulting in that a thin coating film formed from the water based intercoat coating composition ($B_1$) makes it possible to prevent an optical transmission so as to be desirable from economical and resources-saving standpoints, and to prevent deterioration of weather resistance. The intercoat coating film shows little or no sparkling luster in spite of containing the aluminum powder.

In the water based intercoat coating composition ($B_1$), coating the surface of the fine aluminum powder ($B_1$-3) with a phosphate group-containing compound desirably improve stability in water.

The phosphate group-containing compound used for coating the surface of the fine aluminum powder ($B_1$-3) may be exemplified as follows.

(P-1): A polymer prepared by using a phosphate group-containing unsaturated monomer and a hydroxyl group-containing unsaturated monomer as the ingredients and containing phosphate group and hydroxyl group in one molecule.

(P-2): A phosphate group-containing nonaqueous dispersion prepared by dispersing a polymer particle containing a phosphate group-containing unsaturated monomer unit as an ingredient into an organic solvent solution of a macromolecular dispersion stabilizer.

The phosphate group-containing unsaturated monomer used in the preparation of the polymer (P-1) is a compound having at least one of a polymerizable unsaturated bond and a phosphate group represented by the following formula (1): —OPO(OH:) ($R_1$)—(1) where $R_1$ is hydroxyl group, phenyl group or alkyl group having 1 to 20 carbon atoms, in one molecule respectively.

The phosphate group-containing unsaturated monomer may include, for example, (meth)acryloyloxyalkyl ($C_{2-20}$) acid phosphate such as (2-acryloyloxyethyl) acid phosphate, (2-methacrylayloxyethyl) acid phosphate, (2-acryloyloxypropyl) acid phosphate, (2-methacryloyloxypropyl) acid phosphate, 10-acryloyloxydecyl acid phosphate, 10-methacrylayloxydecyl acid phosphate and the like, and the like. The phosphate group-containing unsaturated monomer may also include an equionolar adduct between glycidyl (meth)acrylate and monoalkyl ($C_{1-20}$) phosphate.

The hydroxyl group-containing unsaturated monomer is a compound having hydroxyl group and a polymerizable unsaturated bond in one molecule, and may include, for example, a monoester between $C_{2-20}$ glycol and (meth) acrylic acid such as hydroxyethyl (meth)acrylate, hydroxypropyl (meth)acrylate, hydroxybutyl (meth)acrylate and the like, and the like.

The polymer P-1) may include a copolymer prepared by copolymerizing the phosphate group-containing unsaturated monomer and the hydroxyl group-containing unsaturated monomer as the essential ingredients, and optionally other monomer.

The other monomer is a polymerizable unsaturated compound other than the phosphate group-containing unsaturated monomer and the hydroxyl group-containing unsaturated monomer, and may include, for example, a monoesterified product between (meth)acrylic acid and monohydric alcohol having 1 to 22 carbon atoms, styrene, acrylonitride, vinyl acetate, vinyl chloride, (meth)acrylic acid, maleic acid, maleic anhydride and the like.

In the polymer (P-1), a nixing amount of the phosphate group-containing unsaturated monomer and the hydroxyl group-containing unsaturated monomer is such that the former is in the range of 10 to 90%, preferably 20 to 80%, and the latter is in the range of 90 to 10%, preferably 80 to 20% based on of a total weight of both monomers. The other monomer is in the range of 1000 parts by weight or less, preferably 10 to 500 parts by weight per 100 parts by weight of a total amount of both monomers.

The polymer (P-1) has a hydroxy value in the range of 5 to 150, preferably 10 to 100 mg KOH/g, an acid value due to phosphate group in the range of 10 to 150, preferably 20 to 130 mg KOH/g, and a number average molecular weight in the range of 1000 to 100000, preferably 3000 to 50000.

The polymer particle in the dispersion (P-2) may be prepared by polymerizing monomer components containing a phosphate group-containing unsaturated monomer and optionally other monomer.

The phosphate group-containing unsaturated monomer as the ingredient of the above polymer particle may include, for example, a compound having the phosphate group represented by the formula (1) as described in the polymer (P-1).

A compound represented by the following formula (2):

$$CH_2=CX-CO-(YO)_n-OPO(OH)_2 \qquad (2)$$

where X is hydrogen atom or methyl group, Y is alkylene group having 2 to 4 carbon atoms, and n is an integer of 3 to 30, may also be used as the phosphate group-containing unsaturated monomer in the preparation of the polymer particle of the dispersion (P-2).

Examples of the compound represented by the formula (2) may include acid phosphoxyhexa (or dodeca) (oxypropylene) monomethacrylate and the like.

The other monomer copolymerizable with the phosphate group-containing unsaturated monomer may include a compound having at least one polymerizable unsaturated bond in one molecule, for example, $C_{1-18}$ alkyl esters of (meth) acrylic acid, glycidyl (meth)acrylate, $C_{2-8}$ alkenyl esters of (meth)acrylic acid, $C_{2-3}$ hydroxyalkyl esters of (meth) acrylic acid, $C_{3-18}$ alkenyloxyalkyl esters of (meth)acrylic acid, esters between $C_{2-8}$ hydroxyalkyl esters of (meth) acrylic acid and caprolactone, diesters between glycol and (meth)acrylic acid, vinyl aromatic compound, α, β-ethylenically unsaturated acid, (meth)acrylic amides, (meth)acrylonitrile, vinyl propionate, isocyanate ethyl (meth)acrylate perfluorocyclohexyl (meth)acrylate, N-methyl-p-styrene sulfonamide, γ-methacryloxypropyltrimethoxysilane and the like.

In the preparation of the polymer particle of the nonaqueous dispersion (P-2), a mixing ratio of the phosphate group-containing unsaturated monomer to the other copolymerizable monomer is such that the former is in the range of 0.1 to 100% by weight, preferably 0.5 to 50% by weight, more preferably 3 to 30% by weight, and the latter is in the range of 99.9 to 0% by weight, preferably 99.5 to 50% by weight, more preferably 97 to 70% by weight.

The nonaqueous dispersion (P-2) may be prepared by polymerizing the above monomers in an organic solvent solution of a macromolecular dispersion stabilizer so as to form polymer particles, resulting in obtaining a nonqueous dispersion containing polymer particles derived from monomer components and dispersed in the organic solvent solution of the macromolecular dispersion stabilizer.

The macromolecular dispersion stabilizer is used for stably dispersing the polymer particle, and is compatible with the organic solvent in the dispersion, but is almost incompatible with the polymer particle containing the phosphate group-containing unsaturated monomer unit as an ingredient.

The macromolecular dispersion stabilizer may include, for example, (1) polyester macromonomer (1a) prepared by adding glycidyl (meth)acrylate to a self-condensation polyester resin of hydroxy group-containing fatty acid such as 12-hydroxystearic acid so as to introduce a polymerizable unsaturated bond, and a polymer (1b) prepared by polymerizing a polymerizable monomer with the macromonomer (1a); (2) a polymer (2a) prepared by polymerizing a monomer containing glycidyl (meth)acrylate with the macromonomer (1a), followed by adding an ethylenically unsaturated acid to the glycidyl group in the resulting polymer to introduce a polymerizable unsaturated bond; (3) hydroxyl group-containing acrylic resin; (4) polymerizable unsaturated bond-introduced hydroxyl group-containing acrylic resin; (5) alkyl etherified melamine resin having a high mineral sprit maximum allowable concentration; (6) oil-modified alkyd resin or polymerizable unsaturated bond-introduced oil-modified alkyd resin; (7) cellulose acetate butylate having polymerizable unsaturated bond, and the like. These dispersion stabilizers preferably have a weight average molecular weight in the range of about 1000 to about 50000, preferably about 3000 to about 20000.

Of these dispersion stabilizers, acrylic resins in the above (3) and (4) are particularly preferable, because of being easily soluble in a low polar organic solvent such as aliphatic hydrocarbon and showing good weather resistance.

The organic solvent used in the preparation of the nonaqueous dispersion (P-2) dissolves the macromolecular dispersion stabilizer and disperses the polymer particle without essentially dissolving the polymer particle, and may include, for example, hydrocarbon solvent having a boiling point of about 150° C. or lower, ester solvent, ketone solvent, alcohol solvent, ether solvent and the like.

The nonaqueous dispersion (P-2) may be prepared by dissolving the macromolecular dispersion stabilizer in an organic solvent, followed by subjecting a monomer component containing the phosphate group-containing polymerizable unsaturated monomer to dispersion polymerization. The polymer particle derived from the monomer component containing the phosphate group-containing polymerizable unsaturated monomer has a mean particle size of 0.1 to 1 μm.

The dispersion polymerization in the organic solvent solution of the macromolecular dispersion stabilizer may be carried out by a known radical polymerization and the like, wherein a mixing ratio of these components is such that, for example, a mixing ratio of the macromolecular dispersion stabilizer to the monomer component is such that the macromolecular dispersion stabilizer is in the range of 0.1 to 70%, preferably 5 to 50%, and the monomer component is in the range of 99.9 to 30%, preferably 95 to 50% based on the weight of a total solid content of both components. A mixing ratio of a total solid content of the dispersion stabilizer and the monomer component to the organic solvent is such that the former is 5 to 60%, and the latter is 95 to 40%.

In the case where a crosslinkable functional group such as hydroxyl group is present in a molecule of the macromolecular dispersion stabilizer and the polymer particle, addition of a crosslinking agent to the nonaqueous dispersion (P-2) makes it possible to form a three-dimentionally crosslinked creating film.

As the monomer component used in the preparation of the polymer particle, in addition to the phosphate group-containing polymerizable unsaturated monomer, a combined use of a monomer having at least two polymerizable unsaturated bonds in one molecule, or a monomer having a self-crosslinking reactive group such as N-alkoxymethylated acrylamide makes possible an interparticle crosslinking.

The method of coating the surface of the fine aluminum powder (B-3) with the phosphate group-containing compound may include, for example, (1) a method which comprises grinding or chopping aluminum to size in the presence of the phosphate group-containing compound; (2) a method which comprises adding an organic solvent to a fine aluminum powder to form a paste, followed by adding the phosphate group-containing compound, and stirring; (3) a method which comprises mixing an organic solvent with the phosphate group-containing compound, followed by dispersing thereinto a fine aluminum powder; and (4) a method which comprises mixing an organic solvent, the phosphate group-containing compound and a fine aluminum powder simultaneously, followed by dispersing.

A mixing ratio of the fine aluminum powder to the phosphate group-containing compound (or a coating amount) is such that the phosphate group-containing compound is 1 to 20 parts by weight, preferably 2 to 10 parts by weight per 100 parts by weight of the fine aluminum powder.

A neutralizing agent used for neutralizing carboxyl group in the hydroxyl group and carboxyl group-containing base resin (($B_1$-1) or ($B_2$-1) so as to impart solubility or dispersibility in water may include, for example, ammonia, trimethylamine, triethylamine, dimethyl ethanolamine, triethanolamine, tetraethylammonium hydroxide, diethyl aminoethanol and the like.

The water based intercoat coating composition ($B_1$) contains the hydroxyl group and carboxyl group-containing base resin ($B_1$-1), the crosslinking agent ($B_1$-2), the fine aluminum powder ($B_1$-3) and the titanium oxide white pigment ($B_1$-4), and is a water based coating composition prepared by mixing and dispersing the above components into water, and may optionally contain a curing catalyst for promoting a crosslinking reaction of the intercoat coating film, extender pigments, color pigments, surface controlling agents and the like. The curing catalyst may include those exemplified in the cationic electrodeposition coating composition (A), and may be used in such an amount as 0.1 to 10 parts by weight, preferably 0.5 to 2 parts by weight per 100 parts by weight of a total amount of the base resin ($B_1$-1) and the crosslinking agent ($B_1$-2).

In the method of the present invention, a crosslink-curing starting time of the non-cured coating film of the water based intercoat coating composition ($B_1$) may preferably be later than a crosslink-curing starting time of a non-cured coating film of the cationic electrodeposition coating composition (A) positioned thereunder, preferably may be later than a starting time of a crosslink-curing reaction of the non-cured coating film formed from the cationic electrodeposition coating composition (A) by 0.5 to 10 minutes, preferably 1 to 5 minutes. That is, a period of time for starting curing from a starting time of heating a non-cured coating film formed from the water based intercoat coating composition ($B_1$) to the crosslink-curing starting time is longer than a period of time for starting curing of the non-cured coating film formed from the cationic electrodeposition coating composition (A) by 0.5 to 10 minutes, preferably 1 to 5 minutes.

The crosslink-curing starting time of the non-cured coating film formed from the water based intercoat coating composition ($B_1$) may easily be controlled by arbitrarily selecting a kind and amount of the base resin ($B_1$-1), the crosslinking agent ($B_1$-2), the curing catalyst and the like. A starting time of the crosslink-curing reaction of the non-cured coating film formed from the water based intercoat coating composition ($B_1$) is later than the starting time of the crosslink-curing reaction of the non-cured coating film formed from the cationic electrodeposition coating composition (A) by 0.5 to 10 minutes, preferably 1 to 5 minutes in the coating step respectively.

The water based intercoat coating composition ($B_1$) may be prepared by uniformly mixing and dispersing the base resin ($B_1$-1), the crosslinking agent $B_1$-2), the fine aluminum powder ($B_1$-3) and the titanium oxide white pigment ($B_1$-4) into water, and may have a solid content in the range of 20 to 70% by weight on coating.

Water Based Intercoat Coating Composition ($B_2$)

The water based intercoat coating composition ($B_2$) contains a hydroxyl group and carboxyl group-containing base resin ($B_2$-1), a blocked polyisocyanate crosslinking agent ($B_2$-2) and an alicyclic epoxy compound ($B_2$-3), and is a water based coating composition prepared by mixing and dispersing the above components into water.

The hydroxyl group and carboxyl group-containing base resin ($B_2$-1) is the same as the above base resin ($B_1$-1).

The blocked polyisocyanate crosslinking agent ($B_2$-2) is the same as the above crosslinking agent ($B_1$-2).

A mixing ratio of the base resin ($B_2$-1) to the crosslinking agent ($B_2$-2) in the water based intercoat coating composition ($B_2$) is such that the base resin ($B_2$-1) is in the range of 40 to 90%, preferably 50 to 80%, and crosslinking agent ($B_2$-2) is in the range of 60 to 10%, preferably 50 to 20% based on the weight of a total solid content of both components.

The alicyclic epoxy compound ($B_2$-3) is a compound having at least one alicyclic epoxy group in one molecule. The alicyclic epoxy group means such a functional group that epoxy group is formed from two carbon atoms adjacent to each other and constituting a ring of an alicyclic hydrocarbon skeleton and one oxygen atom. The alicyclic hydrocarbon skeleton may include 4 to 10, preferably 5 to 6 member saturated hydrocarbon rings, condensation hydrocarbon rings prepared by condensation between at least two of the above rings, and bridged hydrocarbon rings prepared by bridging the above hydrocarbon rings by a bridge such as alkylene group and the like.

Examples of the above alicyclic compounds may include compounds represented by the following formulas respectively:

epoxyfied tetrahydrobenzyl alcohol represented by the formula (1):

(1)

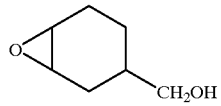

lactone-modified epoxyfied tetrahydrobenzyl alcohol represented by the formula (2):

(2)

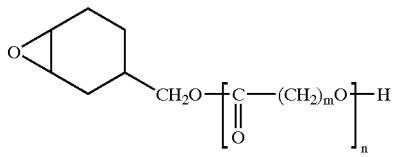

where m is an integer of 2 to 12, and n is an integer of 1 to 20 (on an average), cyclohexene oxide represented by the formula (3):

(3)

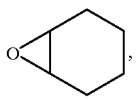

α-pinene oxide represented by the formula (4):

(4)

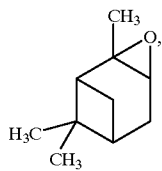

vinyl group-containing cyclohexene oxide represented by the formula (5):

(5)

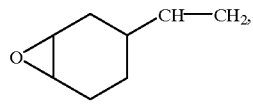

compounds represented by the following formulas:

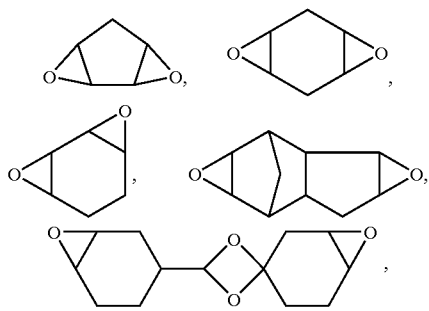

-continued

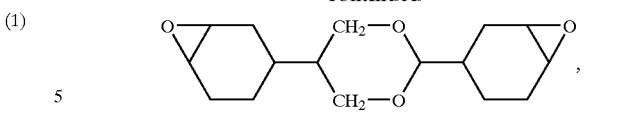

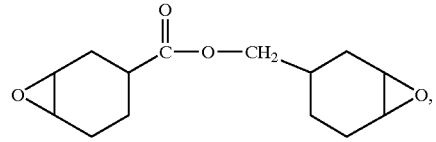

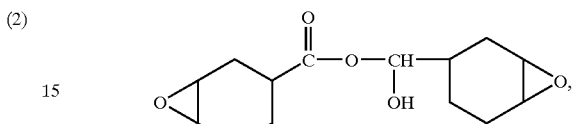

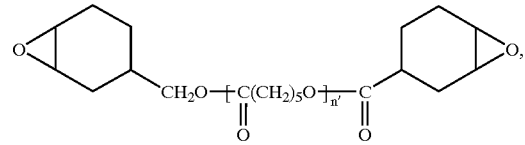

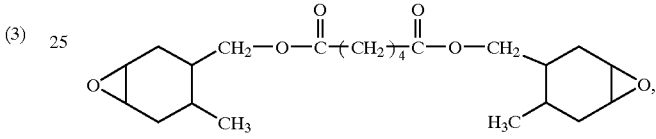

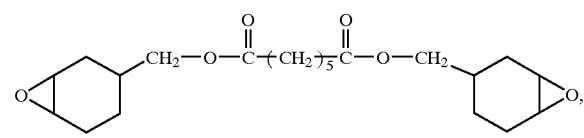

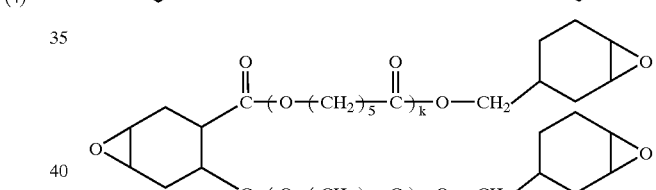

or

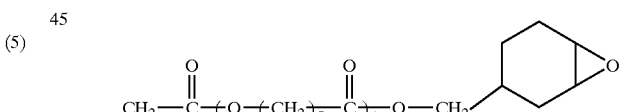

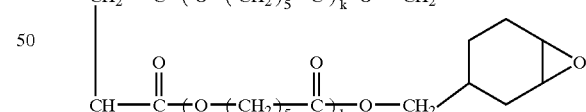

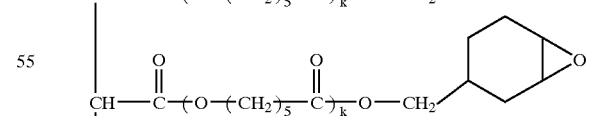

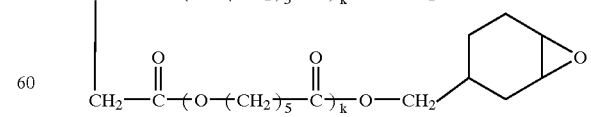

where n is an integer of 1 to 8, and k is an integer of 0 to 15, compounds having the following unit formulas:

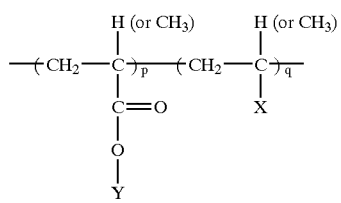

where Y is alicyclic epoxy residual group, X is

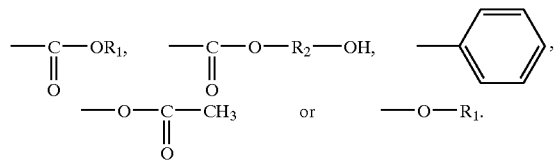

$R_1$ is $C_{1-18}$ alkyl group or cycloalkyl group, $R_2$ is $C_{1-6}$ alkylene group, q is an integer of 0 to 100, P is an integer of 1 to 100, Y in the above unit formula is an organic group having alicyclic epoxy groups such as

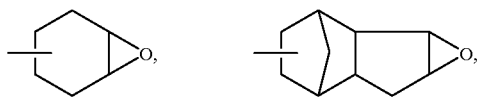

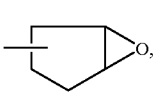 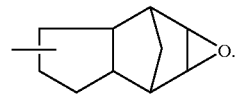

The compound having the above unit formulas may include ones described in Japanese Patent Application No. 209667/89, for example, ones prepared by subjecting a polymerizable epoxy monomer such as 3,4-epoxy cyclohexyl methylacrylate, 3,4-epoxycyclohexyl acrylate, METHB (trade name marketed by Daicel Chemical Industries, Ltd.), AETHB (trade name marketed by Daicel Chemical Industries, Ltd.) and the like to radical polymerization alone or along with other radically polymerizable monomer.

The alicyclic epoxy compound ($B_2$-3) may also include a polymer obtained by use of a compound having alicyclic epoxy group and polymerizable unsaturated bond in one molecule. The compound having alicyclic epoxy group and polymerizable unsaturated bond in one molecule may include, for example, polymerizable epoxy polymer represented by the following formulas (6) to (17):

(6)
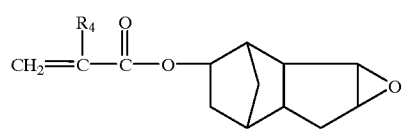

(7)
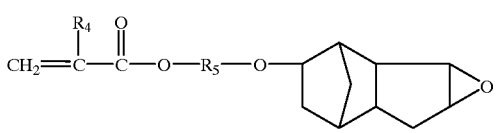

(8)
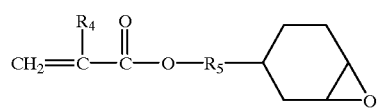

(9)
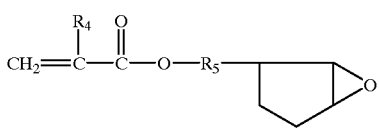

(10)
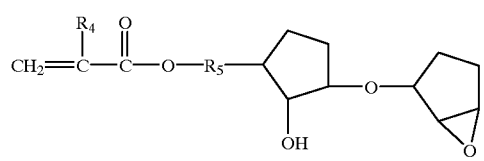

(11)
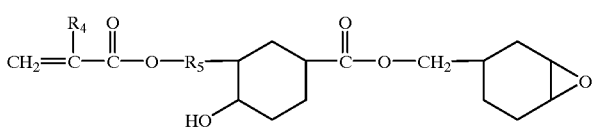

(12)
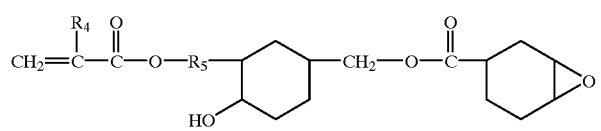

(13)
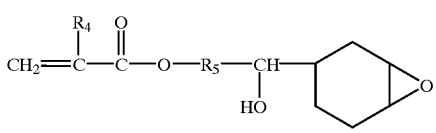

(14)
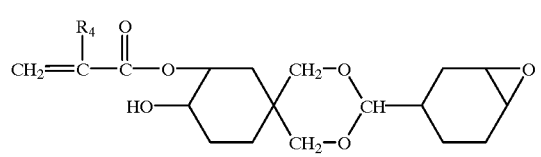

(15)
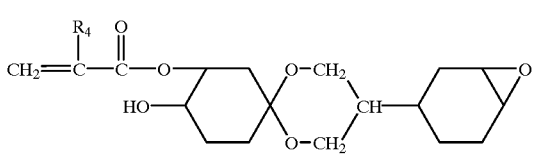

(16)

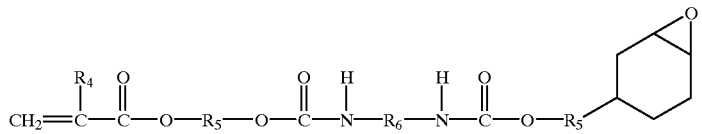

(17)

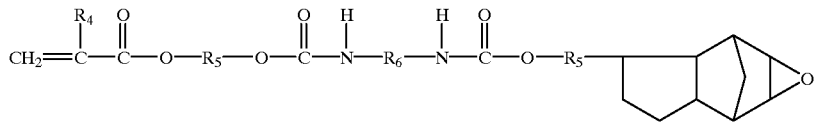

where $R_4$ is hydrogen atom or methyl group. $R_5$ is $C_{1-6}$ bivalent aliphatic saturated hydrocarbon group, $R_6$ is $C_{1-10}$ bivalent aliphatic saturated hydrocarbon group.

The $C_{1-6}$ bivalent aliphatic saturated hydrocarbon group represented by $R_5$ in the polymerizable epoxy monomer may include a straight chain or branched chain alkylene group, for example, methylene ethylene, propylene, tetramethylene, ethylethylene, pentamethylene, hexamethylene and the like, The $C_{1-10}$ bivalent alphatic saturated hydrocarbon group represented by $R_6$ may include, for example, methylene, ethylene propylene, tetramethylene, exhylethylene, pentamethylene, hexamethylene, polymethylene, phenylene

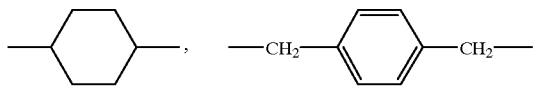

groups and the like.

Specific examples of the polymerizable epoxy monomer represented by the above formulas (6) to (17) may include 3,4-epoxycyclohexyl methyl acrylate, 3,4-epoxycyclohexyl methyl methacrylate and the like. Commercially available ones may include ones obtained by subjecting a polymerizable epoxy monomer such as METHB (trade name, marketed by Daicel Chemical Industries, Ltd.), AETHB (trade name, marketed by Daicel Chemical Industries, Ltd.) and the like to radical polymerization alone or along with other radically polymerizable monomer. Further, 4-vinylcyclohexene oxide may also be used as the polymerizable epoxy monomer.

The alicyclic epoxy compound ($B_2$-3) may be obtained by (CO)polymerizing at least one monomer selected from the above polymerizable epoxy monomers, and ones obtained by copolymerizing the above polymerizable epoxy monomer and other polymerizable monomer may be used as a $B_2$-3) component. The other polymerizable monomer may include a hydroxyl group-containing polymerizable monomer, carboxyl group-containing polymerizable monomer, acrylic monomer, other polymerizable monomer and the like as exemplified in the explanation of the acrylic resin having at least two hydroxyl groups and carboxyl groups respectively in one molecule as the hydroxyl group and carboxyl group-containing base resin ($B_1$-1) or ($B_2$-1).

A mixing ratio of the polymerizable epoxy monomer to other polymerizable monomer may be selected within such a range that the alicyclic epoxy group may be contained at least one, preferably at least two in one molecule of the ($B_2$-3) component, for example, the polymerizable epoxy monomer is in the range of 5 to 100 parts by weight, preferably 20 to 100 parts by weight, and the other polymerizable monomer is in the range of 95 to 0 parts by weight, preferably 80 to 0 parts by weight per 100 parts by weight of a total amount of the polymerizable epoxy monomer and the other polymerizable monomer in the ($B_2$-3) component.

The alicyclic epoxy compound ($B_2$-3) has a number average molecular weight in the range of 90 to 50000, preferably 200 to 20000, and the ($B_2$-3) component has at least one, preferably 2 to 200 of alicyclic epoxy group in one molecule.

The use of an epoxy group-containing compound or resin other than the alicyclic epoxy compound ($B_2$-3) may result an unsatisfactory storage stability of the water based intercoat coating composition, and a multi-layer coating film showing poor anti-chipping properties and water resistance.

A mixing amount of the alicyclic epoxy compound ($B_2$-3) is 0.5 to 20 parts by weight, preferably 1 to 15 parts by weight per 100 parts by weight of a total amount of the hydroxyl group and carboxyl group-containing base resin ($B_2$-1) and the crosslinking agent $B_2$-2).

The water based intercoat coating composition ($B_2$) contains a hydroxyl group and carboxyl group-containing base resin ($B_2$-1), a crosslinking agent ($B_2$-2) and an alicyclic epoxy compound ($B_2$-3), is a water based coating composition prepared by mixing and dispersing the above components into water, and may optionally contain a curing catalyst for promoting a crosslinking reaction of a coating film formed therefrom, extender pigments, color pigments and surface controlling agents. The curing catalyst may include at least one exemplified in the cationic electrodeposition coating composition (A), and is in the range of 0.1 to 10 parts by weight, preferably 0.5 to 2 parts by weight per 100 parts by weight of a total amount of the base resin ($B_2$-1) and the crosslinking agent ($B_2$-2).

In the method of the present invention, a crosslink-curing starting time of the non-cured coating film of the water based intercoat coating composition ($B_2$) may preferably be later than a crosslink-curing starting time of a non-cured coating him of the cationic electrodeposition coating composition (A) positioned thereunder, preferably may be later than a starting time of a crosslink-curing reaction of the non-cured coating film formed from the cationic electrodeposition coating composition (A) by 0.5 to 10 minutes, preferably 1 to 5 minutes. That is, a period of time for starting curing from a starting time of heating a non-cured coating film formed from the water based intercoat coating composition ($B_2$) to the crosslink-curing starting time is longer than a period of time for starting curing of the non-cured coating film formed from the cationic electrodeposition coating composition (A) by 0.5 to 10 minutes, preferably 1 to 5 minutes.

The crosslink-curing starting time of the non-cured coating film formed from the water based intercoat coating composition ($B_2$) may easily be controlled by arbitrarily selecting a kind and amount of the curing agent ($B_2$-2), the alicyclic epoxy compound ($B_2$-3), the curing catalyst and the like. A starting time of the crosslink-curing reaction of the non-cured coating film formed from the water based intercoat coating composition (2) is later than the starting time of the crosslink-curing reaction of the non-cured coating film formed from the cationic electrodeposition coating composition by 0.5 to 10 minutes, preferably 1 to 5 minutes in the coating step respectively.

The water based intercoat coating composition ($B_2$) may be prepared by uniformly mining and dispersing the base resin ($B_2$-1), the crosslinking agent ($B_2$-2), the alicyclic epoxy compound ($B_2$-3) and the like into water, and may have a solid content in the range of 20 to 70% by weight on coating.

The method of the present invention comprises coating a cationic electrodeposition coating composition (A), optionally drying at a temperature of 120° C. or lower without curing, followed by coating a water based intercoat coating composition ($B_1$) or ($B_2$) onto a non-cured electrodeposition coating film, and heating and crosslink-curing both coating films simultaneously.

Coating of the water based intercoat coating composition ($B_1$) or ($B_2$) may be carried out by an electrostatic coating, airless spray coating air spray coating and the like so as to be a cured film thickness of about 5 to 80 $\mu$m, preferably about 15 to 35 $\mu$m. A heating temperature for crosslink-curing the coating film formed from the cationic electrodeposition coating composition (A) and the coating film formed from the water based intercoat coating composition ($B_1$) or ($B_2$) is usually in the range of 130 to 180° C., and heat curing at that temperature for 10 to 40 minutes makes it possible to cure both coating films simultaneously.

Optionally, a topcoating composition such as a solid color coating composition, metallic coating composition, clear coating composition and the like may be coated onto the multi-layer coating film formed by the method of the present invention by the known coating method such as one coat one bake coating method (1C1B), two coats one bake coating method (2C1B), two coats two bakes coating method (2C2B), three coats one bake coating method (3C1B) and the like.

According to the first invention, the multi-layer coating film formed by coating the water based intercoat coating composition ($B_1$) onto the non-cured coating film of the cationic electrodeposition coating composition (A), followed by heating and crosslink-curing both coating films simultaneously shows a reduced luminous transmittance, improved weather resistance, improved interlayer adhesion properties and the like.

Improved substrate-opacifying properties of the water based intercoat coating composition ($B_1$) makes possible a thinner film thickness and a reduced amount to be used.

According to the second invention, the multi-layer coating film formed by coating the water based intercoat coating composition ($B_2$) onto the non-cured coating film of the cationic electrodeposition coating composition (A), followed by heating and crosslink-curing both coating films simultaneously shows improved properties in anti-chipping properties, water resistance, finished appearance such as gloss, interlayer adhesion properties between both coating films after dipping into hot water, and the like.

EXAMPLE

The present invention is explained more in detail by the following Examples and Comparative Examples, in which formulations are based on a solid content, "part" and "%" are by weight, and the coating film thickness is based on the cured coating film.

In Examples and Comparative Examples, measurements of a crosslink-curing reaction starting time of a coating film formed from cationic electrodeposition coating compositions, and of a coating film formed from water based intercoat coating compositions were carried out by use of a pendulum type viscoelastometer such as Rheovibron DDV-OPA Type (marketed by Toyo Baldwin Co., Ltd.).

Preparation Example 1

Preparation of Cationic Electrodeposition Coating Composition (A-1):

Into 450 parts of butyl cellosolve was dissolved 1260 parts of bisphenol A based epoxy resin having an epoxy equivalent of 630 (Epikote 1002, trade name, marketed by Shell Kagaku K. K.), followed by 132 parts of p-nonyl phenol and 105 parts of N-methyl ethanolamine, heating up to 140° C., and reacting at that temperature to obtain an addition epoxy resin having a solid content of 77% and an amine value of 52. To 130 parts of the resulting resin were added 30 parts of blocked polyisocyanate compound (as a curing agent) and 1.3 parts of polypropylene glycol (number average molecular weight 4000), followed by adding 2.1 parts of acetic acid to make water-soluble, adding 6.5 parts of 20% aqueous lead acetate solution, slowly adding deionized water, and dispersing to obtain an emulsion having a solid content of 30%.

On the other hand, 4.7 parts of 75% epoxy based amine type pigment-dispersing resin was neutralized with 0.16 part of 88% aqueous formic acid solution, followed by adding 22.2 parts of deionized water, adding 15 parts of titanium white, 7 parts of clay, 0.3 part of carbon black, 3.0 parts of basic lead silicate and 3 parts of dioctyltin oxide, dispersing in a ball mill to obtain a pigment dispersed paste having a solid content of 55%.

Thereafter, the emulsion having the solid content of 30% was mixed with the pigment dispersed paste having the solid content of 55%, followed by diluting with deionized water so as to obtain an electrodeposition coating composition.

The above blocked polyisocyanate was prepared by reacting a reaction product between 174 parts of 2,6-tolylene diisocyanate and 85 parts of polycaprolactone diol having a hydroxy equivalent of 425 with 2-ethylhexyl alcohol monoether (blocking agent) of ethylene glycol.

Preparation Example 2

Preparation of Cationic Electrodeposition Coating Composition (A-2):

Preparation Example 1 was duplicated except that 6.5 parts of 20% aqueous lead acetate solution was not added, and that 3.0 parts of bismuth hydroxide in place of 3.0 parts of the basic lead silicate was added in the preparation of the pigment paste.

Preparation Example 3

Preparation of Cationic Electrodeposition Coating Composition:

Preparation Example 1 was duplicated except that one part (as bismuth metal) of the following bismuth dispersed paste in place of 6.5 parts of 20% aqueous lead acetate solution and 3.0 parts of the basic lead silicate in the preparation of the pigment paste was added.

The above bismuth dispersed paste was prepared as follows. A vessel was charged with 133.3 parts of epoxy based tertiary amine type pigment-dispersing resin having a solid content of 75% and an amine value of 100 and 81.1 parts of methoxyacetic acid, followed by uniformly stirring, dropping thereinto 233.5 parts of deionized water strongly stirring, adding 111.5 parts of bismuth oxide, and mixing and dispersing in a ball mill for 20 hours to obtain a bismuth dispersed paste having a solid content of 50%.

Preparation Example 4
Preparation of Water Based Intercoat Coating Composition ($B_1$-1):

A mixture of 70 parts of polyester resin (Note 1), 4 parts of dimethyl aminoethanol, 30 parts of aliphatic hexafunctional blocked polyisocyanate compound (Note 2), 10 parts of fine aluminum powder coated with a phosphate group-containing compound (Note 3), 60 parts of titanium oxide white pigment (Note 5) and one part of carbon black was dispersed into deionized water to obtain a water based intercoat coating composition ($B_1$-i) so as to have a viscosity of 10 seconds (Ford-up #4/20° C.) and a solid content of 15%.

(Note 1) Polyester resin: A reactor was charged with 756 parts of neopentyl glycol, 109 parts of trimethylolpropane, 370 parts of hexahydrophthalic acid, 292 parts of adipic acid and 398 parts of isophthalic acid, followed by reacting at 220° C. for 6 hours, adding 45 parts of trimellitic anhydride, reacting at 170° C. for 30 minutes to obtain a polyester resin having a number average molecular weight of about 8000, acid value of 20 mg KOH/g and hydroxy value of 95 mg KOH/g.

(Note 2) Aliphatic hexafunctional blocked polyisocyanate compound prepared by blocking a trimer adduct of hexamethylene diisocyanate with methyl ethyl hetoxime.

(Note 3) The fine aluminum powder coated with a phosphate group-containing compound prepared by mixing 100 parts of a fine aluminum powder having a thickness of 0.03 to 0.1 μm and a mean particle size of 5 to 6 μm with 5 parts of the phosphate group-containing compound (Note 4) and 50 parts of cellosolve acetate, followed by leaving at rest at room temperature for 10 minutes to obtain a paste.

(Note 4) Phosphate group-containing compound:
A copolymer prepared from a monomer mixture of 30 parts of acid phosphoxyethyl methacrylate, 15 parts of 2-hydroxyethyl acrylate, 20 parts of methyl methacrylate, 5 parts of n-butyl methacrylate and 30 parts of 2-ethylhexyl methacrylate, and having a number average molecular weight of 13000 and hydroxy value of 72 mg KOH/g and acid value of 126 mg KOH/g.

(Note 5) Titanium oxide white pigment:
Titanium JR701 (trade name, marketed by Tayca Corporation., Ltd., mean particle size of 0.3 to 0.6 μm).

Preparation Example 5
Preparation of Water Based Intercoat Coating Composition ($B_1$-ii):

A mixture of 100 parts of polyester resin (Note 1), 4 parts of dimethyl aminoethanol, 41 parts of aliphatic trifunctional blocked polyisocyanate compound (Note 6), 14 parts of the fine aluminum powder (Note 3) coated with the phosphate group-containing compound, 85 parts of the titanium oxide white pigment (Note 5) and 0.5 part of carbon black was dispersed into deionized water to obtain water based intercoat coating composition ($B_1$-ii) so as to have a viscosity of 10 seconds (Ford-cup #4/20° C.) and a solid content of 15%.

(Note 6) An aliphatic trifunctional blocked polyisocyanate compound prepared by blocking a trimer of hexamethylene diisocyanate with methyl ethyl ketoxime.

Preparation Example 6
Preparation of Water Based Intercoat Coating Composition ($B_1$-iii) (For Comparison):

Preparation Example 4 was duplicated except that the fine aluminum powder (Note 3) and the titanium oxide white pigment (Note 5) added in the water based intercoat coating composition ($B_1$-1) were not added to obtain the water based intercoat coating composition ($B_1$-iii).

Preparation Example 7
Preparation of Water Based Intercoat Coating Composition ($B_2$-i):

A mixture of 1000 parts of polyester resin (Note 1), 40 parts of dimethyl aminoethanol (Note 7), 410 parts of aliphatic hexafunctional blocked polyisocyanate compound (Note 2), 100 parts of alicyclic epoxy compound (Note 8), 1400 parts of titanium white pigment and 20 parts of carbon black was dispersed into 1800 parts of deionized water to obtain water base intercoat coating composition ($B_2$-i).

(Note 7) Dimethyl aminoethanol:
Aminoalcohol 2 Mabs (trade name, marketed by Nippon Newkazai Co., Ltd.).

(Note 8) Alicyclic epoxy compound:
Celloxide 2021 (trade name marketed by Daicel Chemical Industries. Ltd. represented by the following formula).

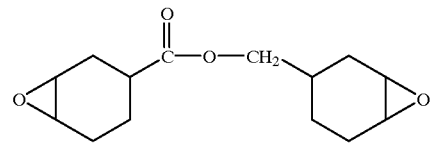

Preparation Example 8
Preparation of Water Based Intercoat Coating Composition ($B_2$-ii):

A mixture of 1000 parts of polyester resin (Note 1), 40 parts of dimethyl aminoethanol (Note 7), 40 parts of aliphatic trifunctional blocked polyisocyanate compound (Note 6), 100 parts of alicyclic epoxy compound (Note 9), 1400 parts of titanium white pigment and 20 parts of carbon black was dispersed into 1800 parts of deionized water to obtain a water based intercoat coating composition ($B_2$-ii).

(Note 9) Alicyclic epoxy compound:
ERL-4299 (trade name, marketed by Union Carbide Japan K. K., represented by the following formula).

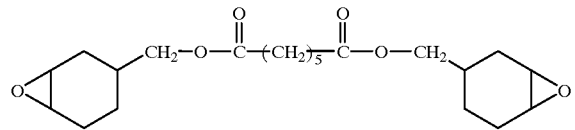

Preparation Example 9
Preparation of Water Based Intercoat Coating Composition ($B_2$-iii):

A mixture of 1000 parts of acrylic resin (Note 10), 40 parts of dimethyl aminoethanol (Note 7), 410 parts of aliphatic trifunctional blocked polyisocyanate compound (Note 6), 100 parts of alicyclic epoxy compound (Note 11), 1400 parts of titanium white pigment (Note 5) and 20 parts of carbon black was dispersed into 1800 parts of deionized water to obtain water based intercoat coating composition ($B_2$-iii).

(Note 10) Acrylic resin: A reactor was charged with 210 parts of styrene, 294 parts of n-butyl methacrylate, 253 parts of hydroxybutyl acrylate, 200 parts of 2-ethhylhexyl methacrylate and 30 parts of acrylic acid, followed by reacting at 120° C. for 5 hours to obtain an acrylic resin having a number average molecular weight of about 2000, acid value of 250 mg KOH/g and hydroxy value of 95 mg KOH/g.

(Note 11) Alicyclic epoxy compound:

Epolead GT-300 (trade name, marketed by Daicel Chemical Industries, Ltd., represented by the following formula):

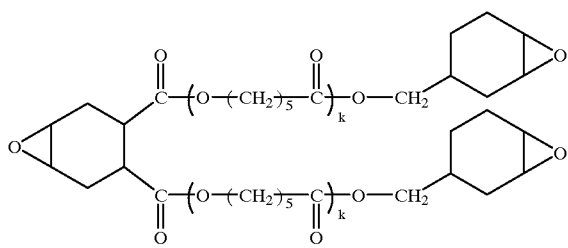

Preparation Example 10
Preparation of Water Based Intercoat Coating Composition ($B_2$-iv) (For Comparison):

Preparation Example 4 was duplicated except that the alicyclic epoxy compound (Note 8) in the water based intercoat coating composition ($B_2$-i) was not added to obtain water based intercoat coating composition ($B_2$-iv).

Examples 1–10 and Comparative Examples 1–2

A zinc phosphate treated dull finish steel plate was dipped into electrodeposition coating bathes containing the cationic electrodeposition coating compositions (A-1) to (A-3) as cathodes respectively, followed by carrying out an electrodeposition coating for 3 minutes at 30° C. and 200 V so as to be a coating film thickness of 25 μm, drying at 100° C. for 10 minutes, coating thereonto water based intercoat coating compositions ($B_1$-i) to ($B_1$-ii) and ($B_2$-i) to ($B_2$-iv) by airless spray coating so as to be a coating film thickness of 15 μm for ($B_1$-i) to ($B_1$-iii) and 35 μm for ($B_2$-i) to ($B_2$-iv) respectively, and heating and crosslink-curing both coating film simultaneously.

The resulting multi-layer coating films were subjected to coating film performance tests. Test results are shown in Tables 1 and 2.

TABLE 1

|  | Examples | | | | Comparative Example |
|---|---|---|---|---|---|
|  | 1 | 2 | 3 | 4 | 1 |
| Cationic electrodeposition coating composition (A) | A-2 | A-2 | A-3 | A-3 | A-1 |
| A period of time for starting curing (minutes) | 10 | 10 | 10 | 10 | 10 |
| Water based intercoat coating composition (B) | $B_1$-i | $B_1$-ii | $B_1$-i | $B_1$-ii | $B_1$-iii |
| Film thickness (μm) | 15 | 15 | 15 | 15 | 15 |
| A period of time for starting curing (minutes) | 12 | 13 | 12 | 13 | 12 |
| Coating film performance |  |  |  |  |  |
| Gloss | 88 | 86 | 81 | 86 | 85 |
| Smoothness | 3 | 3 | 3 | 3 | 3 |
| Anti-chipping properties | 3 | 3 | 3 | 3 | 3 |
| Weather resistance | 3 | 3 | 3 | 3 | 1 |
| Interlayer adhesion properties | 100 | 100 | 100 | 100 | 0 |

TABLE 2

|  | Examples | | | | | | Comparative Example |
|---|---|---|---|---|---|---|---|
|  | 5 | 6 | 7 | 8 | 9 | 10 | 2 |
| Cationic electrodeposition coating composition (A) | A-2 | A-2 | A-2 | A-3 | A-3 | A-3 | A-1 |
| A period of time for starting curing (minutes) | 10 | 10 | 10 | 10 | 10 | 10 | 10 |
| Water based intercoat coating composition (B) | $B_2$-i | $B_2$-ii | $B_2$-iii | $B_2$-i | $B_2$-ii | $B_2$-iii | $B_2$-iv |
| Film thickness (μm) | 35 | 35 | 35 | 35 | 35 | 35 | 35 |
| A period of time for starting curing minutes | 12 | 13 | 11 | 12 | 13 | 11 | 12 |
| Coating film performance |  |  |  |  |  |  |  |
| Gloss | 86 | 88 | 86 | 89 | 88 | 87 | 81 |
| Anti-chipping properties | 3 | 3 | 3 | 3 | 3 | 3 | 1 |
| Water resistance | 3 | 3 | 3 | 3 | 3 | 3 | 1 |
| Interlayer adhesion properties | 100 | 100 | 100 | 100 | 100 | 100 | 0 |

Test Method

Gloss: 60° specular reflectance

Smoothness: Coating film appearance was visually evaluated as follows. 3: Good in smoothness, 2: slightly poor in smoothness, 1: seriously poor in smoothness.

Anti-Chipping Properties:

By use of a Q-G-R Gravelometer (trade name, marketed by Q Panel Co., Ltd.), 100 g of gravels hiving a diameter of 15 to 20 mm was air sprayed onto the surface of a crating film at a spray angle of 90°, under an air pressure of about 4 kg/cm² at −20° C., followed by visually evaluating conditions of the surface of the coating film as follows. 3: slight impact mars in the surface of an intercoat coating film, but no separatian of an electrodeposition coating film; 2: considerable amount of impact mars on the surface of the intercoat coating film but slight separation of the electrodeposition coating film; 1: many impact mars on the surface of the intercoat coating film, and considerable separation of the electrodeposition coating film.

Weather Resistance:

Irradiation of 1000 hours by use of a sunshine weatherometer was followed by visually evaluating conditions of the surface of the coating film as follows. 3: showing no changes and good weather resistance; 2: showing reduction in gloss, slight cracks, chalking or whitening, etc., and slightly poor weather resistance; 1: showing reduction in gloss, remarkable cracks, chalking or whitening, etc. and poor weather resistance.

Water Resistance:

Dipping into hot water at 80° C. for 24 hours was followed by washing with water, and drying to visually evaluate the surface of the coating film as follows. 3: nothing abnormal; 2: slight reduction in gloss; 1: whitening developed.

Interlayer Adhesion Properties:

The above dipping into hot water was followed by cutting by use of a cutter so as to reach a substrate and to form 100 squares of 1 mm×1 mm, followed by adhering thereinto an adhesive cellophane tape, strongly separating the tape at 20° C., and examining a number of remaining squares.

What is claimed is:

1. A multi-layer coating film-forming method which comprises coating a cationic electrodeposition coating composition (A) containing a blocked polyisocyanate compound as a crosslinking agent and bismuth hydroxide to form a non-cured electrodeposition coating film, coating a water based intercoat coating composition ($B_1$) containing a hydroxyl group and carboxyl group-containing base resin, a blocked polyisocyanate crosslinking agent, a fine aluminum powder and a titanium oxide white pigment onto the non-cured electrodeposition coating film to form a non-cured intercoat coating film, followed by heat curing both coating films simultaneously, the fine aluminum powder being contained in the range of 0.1 to 30 parts by weight, and the titanium oxide white pigment being contained in the range of 1 to 200 parts by weight per 100 carts by weight of a total amount of the hydroxyl group and carboxyl group-containing base resin and the crosslinking agent respectively.

2. A method as claimed in claim 1, wherein a crosslink-curing reaction of the non-cured electrodepostion coating film is controlled to take place earlier than a crosslink-curing reaction of the non-cured intercoat coating film.

3. A method as claimed in claim 1, wherein the fine aluminum powder has a mean partial site in the range of 20 $\mu$m or less, and optionally is coated with a phosphate group-containing compound.

4. The method as claimed in claim 1, wherein the bismuth hydroxide is in the form of a water-dispersed paste prepared by mixing and dispersing in the presence of a dispersing agent into an aqueous medium a water-insoluble bismuth compound and an aliphatic carboxylic acid represented by the formula: $R_1C(H)(OR_2)(CH_2)_nCOOH$, wherein $R_1$ is hydrogen atom or an alkyl group having 1 to 3 carbon atoms, $R_2$ is hydrogen atom or an alkyl group having 1 to 10 carbon atoms and n is 0 or 1, and containing therein an aliphatic carboxylic acid-modified bismuth compound in a water-insoluble state.

* * * * *